United States Patent
Wu et al.

(10) Patent No.: US 11,375,170 B2
(45) Date of Patent: Jun. 28, 2022

(54) METHODS, SYSTEMS, AND MEDIA FOR RENDERING IMMERSIVE VIDEO CONTENT WITH FOVEATED MESHES

(71) Applicant: Google LLC, Mountain View, CA (US)

(72) Inventors: Wanmin Wu, Foster City, CA (US); Samuel Kvaalen, San Francisco, CA (US); Ivan Janatra, Santa Clara, CA (US); Changchang Wu, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/940,717

(22) Filed: Jul. 28, 2020

(65) Prior Publication Data
US 2021/0029340 A1     Jan. 28, 2021

Related U.S. Application Data (60) Provisional application No. 62/879,529, filed on Jul. 28, 2019.

(51) Int. Cl.
*H04N 13/122* (2018.01)
*H04N 13/178* (2018.01)
(Continued)

(52) U.S. Cl.
CPC ......... *H04N 13/122* (2018.05); *G06T 15/005* (2013.01); *H04N 13/178* (2018.05); *H04N 2013/0088* (2013.01)

(58) Field of Classification Search
CPC ............... H04N 13/122; H04N 13/178; H04N 2013/0088; G06T 15/005
See application file for complete search history.

(56) References Cited

U.S. PATENT DOCUMENTS

| | | | |
|---|---|---|---|
| 5,422,653 A * | 6/1995 | Maguire, Jr. | H04N 13/239 345/9 |
| 5,748,199 A * | 5/1998 | Palm | H04N 13/133 345/473 |

(Continued)

FOREIGN PATENT DOCUMENTS

| | | |
|---|---|---|
| WO | WO 2018222271 | 12/2018 |
| WO | WO 2019118028 | 6/2019 |

OTHER PUBLICATIONS

Facebook Technologies LLC, "Oculus Quest and Go: Fixed Foveated Rendering," Last accessed Jul. 22, 2020, pp. 1-5, available at: https://developer.oculus.com/documentation/unreal/unreal-ffr/.

(Continued)

*Primary Examiner* — Charles L Beard
(74) *Attorney, Agent, or Firm* — Byrne Poh LLP (57) ABSTRACT

Methods, systems, and media for rendering immersive video content with foveated meshes are provided. In some embodiments, the method comprises: receiving a video content item; determining, using a hardware processor, whether the video content item meets at least one criterion; in response to determining that the video content item meets the at least one criterion, generating, using the hardware processor, a foveated mesh in accordance with a foveation ratio parameter on which frames of the video content item are to be projected, wherein the foveated mesh has a non-uniform position map that increases pixel density in a central portion of each frame of the video content item in comparison with peripheral portions of each frame of the video content item; and storing the video content item in a file format that includes the generated foveated mesh, wherein the immersive video content is rendered by applying the video content item as a texture to the generated foveated mesh.

19 Claims, 4 Drawing Sheets

(51) Int. Cl.
*G06T 15/00* (2011.01)
*H04N 13/00* (2018.01)

(56) References Cited

U.S. PATENT DOCUMENTS

| | | | | |
|---|---|---|---|---|
| 6,252,989 B1* | 6/2001 | Geisler | H04N 19/176 | 345/555 |
| 6,426,755 B1* | 7/2002 | Deering | H04N 13/257 | 345/581 |
| 6,455,831 B1* | 9/2002 | Bandera | G06V 10/20 | 250/208.6 |
| 6,664,955 B1* | 12/2003 | Deering | G06T 3/4007 | 345/418 |
| 7,020,319 B2* | 3/2006 | Mertelmeier | A61B 6/032 | 378/163 |
| 8,956,396 B1* | 2/2015 | Friend | A61N 5/0622 | 607/88 |
| 9,721,393 B1* | 8/2017 | Dunn | G06F 3/013 | |
| 9,779,478 B1* | 10/2017 | Wilson | G06T 3/4092 | |
| 9,898,857 B2* | 2/2018 | Dillard | G06T 7/90 | |
| 10,169,843 B1* | 1/2019 | Amer | G06T 7/13 | |
| 10,217,488 B1* | 2/2019 | Huang | H04N 5/247 | |
| 10,262,387 B2* | 4/2019 | Spitzer | G06T 1/20 | |
| 10,303,940 B2* | 5/2019 | Zhang | G06F 3/0304 | |
| 10,319,114 B2* | 6/2019 | Bastani | H04N 19/167 | |
| 10,438,400 B2* | 10/2019 | Patney | G06F 3/013 | |
| 10,475,370 B2* | 11/2019 | Spitzer | G09G 5/393 | |
| 10,546,364 B2* | 1/2020 | Bastani | G06T 3/0093 | |
| 10,553,016 B2* | 2/2020 | Turner | G06T 15/205 | |
| 10,564,715 B2* | 2/2020 | Spitzer | G02B 27/0093 | |
| 10,572,764 B1* | 2/2020 | Bastani | H04N 13/383 | |
| 10,628,994 B2* | 4/2020 | Peli | G06F 3/012 | |
| 10,694,170 B2* | 6/2020 | Malaika | G06F 3/0346 | |
| 10,764,552 B2* | 9/2020 | Perreault | H04N 13/307 | |
| 10,775,617 B2* | 9/2020 | Milford | G02B 27/0955 | |
| 10,922,878 B2* | 2/2021 | Neulander | G06T 19/006 | |
| 10,950,305 B1* | 3/2021 | Seiler | G09G 5/39 | |
| 10,992,916 B2* | 4/2021 | Schmidt | H04N 5/23258 | |
| 11,048,082 B1* | 6/2021 | Movshovich | G02B 27/017 | |
| 11,064,387 B1* | 7/2021 | Movshovich | H04N 13/194 | |
| 11,109,011 B2* | 8/2021 | Horvitz | H04N 21/234363 | |
| 11,138,747 B1* | 10/2021 | Seiler | G06T 7/90 | |
| 11,138,800 B1* | 10/2021 | Seiler | G06T 7/90 | |
| 2001/0028352 A1* | 10/2001 | Naegle | G06T 15/005 | 345/501 |
| 2004/0227703 A1* | 11/2004 | Lamvik | G09G 3/3233 | 345/76 |
| 2005/0018911 A1* | 1/2005 | Deever | H04N 19/126 | 375/E7.14 |
| 2009/0123036 A1* | 5/2009 | Huang | A61B 3/1225 | 382/117 |
| 2009/0123044 A1* | 5/2009 | Huang | A61B 3/0058 | 382/128 |
| 2009/0245600 A1* | 10/2009 | Hoffman | H04N 13/156 | 348/240.99 |
| 2009/0248036 A1* | 10/2009 | Hoffman | A61B 1/045 | 606/130 |
| 2012/0142415 A1* | 6/2012 | Lindsay | H04N 5/2224 | 463/33 |
| 2015/0019130 A1* | 1/2015 | Rutkiewicz | F42B 15/01 | 701/519 |
| 2015/0124216 A1* | 5/2015 | Abramoff | A61B 3/0025 | 351/206 |
| 2015/0287158 A1* | 10/2015 | Cerny | G09G 5/14 | 345/553 |
| 2016/0313184 A1* | 10/2016 | Owechko | G06K 9/6219 | |
| 2016/0350965 A1* | 12/2016 | Lum | G06T 15/005 | |
| 2016/0379606 A1* | 12/2016 | Kollin | G06T 3/4038 | 345/428 |
| 2017/0055825 A1* | 3/2017 | Tumlinson | A61B 3/0075 | |
| 2017/0124757 A1* | 5/2017 | Sathe | G06T 15/04 | |
| 2017/0124760 A1* | 5/2017 | Murakawa | G06T 11/40 | |
| 2017/0169602 A1* | 6/2017 | Blackmon | G06T 15/06 | |
| 2017/0178395 A1* | 6/2017 | Pharr | G06T 15/205 | |
| 2017/0193296 A1* | 7/2017 | Duong | G06K 9/00335 | |
| 2017/0199496 A1* | 7/2017 | Grata | G02B 27/017 | |
| 2017/0200252 A1* | 7/2017 | Nguyen | G06F 13/4239 | |
| 2017/0200308 A1* | 7/2017 | Nguyen | G06T 15/005 | |
| 2017/0227771 A1* | 8/2017 | Sverdrup | G02B 5/289 | |
| 2017/0236252 A1* | 8/2017 | Nguyen | G06T 15/00 | 345/419 |
| 2017/0236466 A1* | 8/2017 | Spitzer | G09G 3/3275 | 345/560 |
| 2017/0263046 A1* | 9/2017 | Patney | G06F 3/013 | |
| 2017/0282062 A1* | 10/2017 | Black | A63F 13/428 | |
| 2017/0285349 A1* | 10/2017 | Ayres | G02B 27/0172 | |
| 2017/0285735 A1* | 10/2017 | Young | G06F 3/013 | |
| 2017/0285736 A1* | 10/2017 | Young | G06F 1/163 | |
| 2017/0287112 A1* | 10/2017 | Stafford | G06F 3/013 | |
| 2017/0287446 A1* | 10/2017 | Young | G06F 3/013 | |
| 2017/0293995 A1* | 10/2017 | Saleh | G06T 15/005 | |
| 2017/0295353 A1* | 10/2017 | Hwang | H04N 13/383 | |
| 2017/0316601 A1* | 11/2017 | Kakarlapudi | G06T 15/005 | |
| 2017/0316753 A1* | 11/2017 | Dunn | G06T 3/4092 | |
| 2018/0020204 A1* | 1/2018 | Pang | H04N 13/156 | |
| 2018/0040097 A1* | 2/2018 | Saleh | G06T 1/20 | |
| 2018/0061117 A1* | 3/2018 | Pohl | G06F 3/011 | |
| 2018/0082464 A1* | 3/2018 | Akenine-Moller | G06T 15/30 | |
| 2018/0089091 A1* | 3/2018 | Akenine-Moller | G06T 1/60 | |
| 2018/0107271 A1* | 4/2018 | Woo | G06F 3/013 | |
| 2018/0136720 A1* | 5/2018 | Spitzer | G06F 3/013 | |
| 2018/0165792 A1* | 6/2018 | Tavakoli | G06F 3/013 | |
| 2018/0176551 A1* | 6/2018 | Viswanathan | H04N 9/3161 | |
| 2018/0182066 A1* | 6/2018 | Saleh | H04N 1/3876 | |
| 2018/0188543 A1* | 7/2018 | Rainisto | G02B 7/1805 | |
| 2018/0220119 A1* | 8/2018 | Horvitz | H04N 21/234363 | |
| 2018/0262758 A1* | 9/2018 | El-Ghoroury | G06F 3/012 | |
| 2018/0275772 A1* | 9/2018 | Bastani | G06F 3/038 | |
| 2018/0276790 A1* | 9/2018 | Mantor | G06T 1/20 | |
| 2018/0286105 A1* | 10/2018 | Surti | G06F 3/011 | |
| 2018/0292897 A1* | 10/2018 | Wald | G06F 3/011 | |
| 2018/0300951 A1* | 10/2018 | Surti | G06F 3/0484 | |
| 2018/0316908 A1* | 11/2018 | Chernobieff | H04N 13/383 | |
| 2018/0335836 A1* | 11/2018 | Miller | G02B 27/017 | |
| 2018/0350032 A1* | 12/2018 | Bastani | G06T 19/00 | |
| 2018/0350036 A1* | 12/2018 | VanReenen | G06T 3/0093 | |
| 2018/0356884 A1* | 12/2018 | Lee | H04S 3/008 | |
| 2018/0357780 A1* | 12/2018 | Young | G06T 7/66 | |
| 2018/0357794 A1* | 12/2018 | Young | G06T 13/80 | |
| 2018/0367769 A1* | 12/2018 | Greenberg | H04N 9/3129 | |
| 2019/0019315 A1* | 1/2019 | Bastani | H04N 19/174 | |
| 2019/0026864 A1* | 1/2019 | Chen | G06T 3/4046 | |
| 2019/0035049 A1* | 1/2019 | Backer | G06T 15/005 | |
| 2019/0035363 A1* | 1/2019 | Schluessler | G06T 1/20 | |
| 2019/0043167 A1* | 2/2019 | Steyskal | G06T 3/0012 | |
| 2019/0066365 A1* | 2/2019 | Schmalstieg | G06T 15/80 | |
| 2019/0086679 A1* | 3/2019 | Ratcliff | H04N 13/344 | |
| 2019/0102865 A1* | 4/2019 | Hensley | G06T 15/005 | |
| 2019/0110053 A1* | 4/2019 | Varia | H04N 19/174 | |
| 2019/0130629 A1* | 5/2019 | Chand | H04L 65/1069 | |
| 2019/0147643 A1* | 5/2019 | Turner | G06T 15/205 | 345/428 |
| 2019/0206315 A1* | 7/2019 | Park | G09G 3/3225 | |
| 2019/0206369 A1* | 7/2019 | Kempf | G09G 5/363 | |
| 2019/0318526 A1* | 10/2019 | Hunt | G06T 19/006 | |
| 2019/0318709 A1* | 10/2019 | Wicks | G06T 11/40 | |
| 2019/0347757 A1* | 11/2019 | Selvik | G06T 3/40 | |
| 2019/0355287 A1* | 11/2019 | Lemoff | G06T 19/006 | |
| 2019/0362557 A1* | 11/2019 | Lacey | G06F 3/012 | |
| 2019/0362691 A1* | 11/2019 | Lamkin | G09G 3/001 | |
| 2019/0391641 A1* | 12/2019 | VanReenen | G06F 3/011 | |
| 2020/0007838 A1* | 1/2020 | Stafford | G02B 27/4205 | |
| 2020/0034993 A1* | 1/2020 | Croxford | G02B 27/017 | |
| 2020/0049946 A1* | 2/2020 | Peuhkurinen | G06F 3/013 | |
| 2020/0051213 A1* | 2/2020 | Nallam | G06T 15/005 | |
| 2020/0051214 A1* | 2/2020 | Nallam | G09G 5/391 | |
| 2020/0058152 A1* | 2/2020 | Zhang | G06T 9/00 | |
| 2020/0090396 A1* | 3/2020 | Holmes | G06T 1/20 | |
| 2020/0143516 A1* | 5/2020 | Martin | G06F 3/013 | |
| 2020/0143550 A1* | 5/2020 | Golas | G06K 9/6202 | |
| 2020/0143580 A1* | 5/2020 | Seiler | G06T 11/40 | |
| 2020/0143585 A1* | 5/2020 | Seiler | G06T 15/40 | |
| 2020/0211246 A1* | 7/2020 | Koyama | G06F 3/04883 | |

(56) References Cited

U.S. PATENT DOCUMENTS

| | | | |
|---|---|---|---|
| 2020/0213575 A1* | 7/2020 | Shibagami | G06T 19/006 |
| 2020/0218342 A1* | 7/2020 | Murali | A61B 3/10 |
| 2020/0265594 A1* | 8/2020 | Aguirre-Valencia | G06F 3/011 |
| 2020/0265797 A1* | 8/2020 | Croxford | G09G 3/2092 |
| 2020/0275071 A1* | 8/2020 | Zavoyskikh | G02B 27/0179 |
| 2020/0288164 A1* | 9/2020 | Lin | G06F 3/0346 |
| 2020/0294209 A1* | 9/2020 | Pohl | G06T 5/006 |
| 2020/0341273 A1* | 10/2020 | Jokinen | G06F 3/012 |
| 2020/0349751 A1* | 11/2020 | Bentovim | G06T 13/40 |
| 2020/0387218 A1* | 12/2020 | Cooper | G06F 3/013 |
| 2020/0388022 A1* | 12/2020 | Bou | G06N 3/02 |
| 2020/0394830 A1* | 12/2020 | Choubey | G06T 15/005 |
| 2021/0019955 A1* | 1/2021 | Aga | G02B 27/0025 |
| 2021/0026445 A1* | 1/2021 | Stoner | H04N 13/20 |
| 2021/0027752 A1* | 1/2021 | Holmes | G06F 3/013 |
| 2021/0029333 A1* | 1/2021 | Naftali | H04N 9/3164 |
| 2021/0037287 A1* | 2/2021 | Ha | H04N 21/4316 |
| 2021/0086075 A1* | 3/2021 | Cockram | G06T 13/40 |
| 2021/0092343 A1* | 3/2021 | Ji | G06T 3/40 |
| 2021/0096644 A1* | 4/2021 | Wang | G06F 3/013 |
| 2021/0127117 A1* | 4/2021 | Pan | H04L 65/607 |
| 2021/0136397 A1* | 5/2021 | Lakshmikantha | H04N 19/48 |
| 2021/0142443 A1* | 5/2021 | Eble | H04N 21/816 |
| 2021/0158629 A1* | 5/2021 | Breugelmans | G06T 19/20 |
| 2021/0165213 A1* | 6/2021 | Balachandreswaran | H04N 21/4728 |
| 2021/0166341 A1* | 6/2021 | Bastani | G06T 3/0025 |
| 2021/0173474 A1* | 6/2021 | Sztuk | G06T 19/006 |
| 2021/0174768 A1* | 6/2021 | Jarven | G06F 3/012 |
| 2021/0176448 A1* | 6/2021 | Vogelzang | H04N 13/282 |
| 2021/0192854 A1* | 6/2021 | Ryu | G06T 7/571 |
| 2021/0233207 A1* | 7/2021 | Ha | G06T 3/005 |
| 2021/0250616 A1* | 8/2021 | Chou | H04N 19/18 |
| 2021/0274155 A1* | 9/2021 | Yun | H04N 13/161 |
| 2021/0274200 A1* | 9/2021 | Cismas | H04N 19/174 |
| 2021/0319533 A1* | 10/2021 | Choi | G06T 7/50 |
| 2022/0004009 A1* | 1/2022 | Myhre | G02B 27/0093 |

OTHER PUBLICATIONS

Guenter et al., "Foveated 3D Graphics", in ACM Transcations on Graphics, vol. 31, No. 6, Nov. 2012, pp. 1-10.

International Search Report and Written Opinion dated Mar. 27, 2020 in International Patent Application No. PCT/US2019/065417.

Meng et al., "Kernel Foveated Rendering", in Proceedings of the ACM on Computer Graphics and Interactive Techniques, vol. 1, No. 1, Jul. 2018, pp. 1-20.

Wikipedia, "Foveated Rendering," last accessed Jul. 22, 2020, pp. 1-3, available at: https://en.wikipedia.org/wiki/Foveated_rendering.

\* cited by examiner

METHODS, SYSTEMS, AND MEDIA FOR RENDERING IMMERSIVE VIDEO CONTENT WITH FOVEATED MESHES

CROSS-REFERENCE TO RELATED APPLICATION

This application claims the benefit of U.S. Provisional Patent Application No. 62/879,529, filed Jul. 28, 2019, which is hereby incorporated by reference herein in its entirety.

TECHNICAL FIELD

The disclosed subject matter relates to methods, systems, and media for rendering immersive video content with foveated meshes. More particularly, the disclosed subject matter can apply video content as a texture to a foveated mesh that increases pixel density in a center portion of a video by trading off pixel density in a peripheral portion of the video.

BACKGROUND

Many users enjoy viewing video content in immersive environments, such as virtual reality content, augmented reality content, three-dimensional content, 180-degree content, or 360-degree content, that can provide a viewer with an immersive experience. For example, a virtual reality system can generate an immersive virtual reality environment for a user, where the user can interact with one or more virtual objects. In a more particular example, the immersive virtual reality environment can be provided using devices, such as virtual reality headset devices or head mounted display devices. In another example, an augmented reality system can generate an immersive augmented reality environment for a user, where computer-generated content (e.g., one or more images) can be superimposed on a user's current view (e.g., using a camera of a mobile device).

Immersive video content is frequently rendered by applying video content to a mesh, such as a fisheye mesh or a three-dimensional equirectangular mesh, which causes the video content to be rendered as if it were filling a portion of a sphere rather than as appearing flat. However, rendering immersive video content while optimizing the video quality of such content is a difficult and resource intensive task.

Accordingly, it is desirable to provide new methods, systems, and media for rendering immersive video content with foveated meshes.

SUMMARY

Methods, systems, and media for rendering immersive video content with foveated meshes are provided.

In accordance with some embodiments of the disclosed subject matter, a method for generating immersive video content is provided, the method comprising: receiving a video content item; determining, using a hardware processor, whether the video content item meets at least one criterion; in response to determining that the video content item meets the at least one criterion, generating, using the hardware processor, a foveated mesh in accordance with a foveation ratio parameter on which frames of the video content item are to be projected, wherein the foveated mesh has a non-uniform position map that increases pixel density in a central portion of each frame of the video content item in comparison with peripheral portions of each frame of the video content item; and storing the video content item in a file format that includes the generated foveated mesh, wherein the immersive video content is rendered by applying the video content item as a texture to the generated foveated mesh.

In some embodiments, the at least one criterion includes determining whether the received video content item is associated with a particular file format. In some embodiments, the particular file format includes a VR180 file format that uses a directional stereoscopic projection with a 180-degree field of view.

In some embodiments, the at least one criterion includes determining whether the received video content item includes stereoscopic content or monoscopic content and the method further comprises generating the foveated mesh in response to determining that the received video content item includes stereoscopic content.

In some embodiments, the at least one criterion includes determining whether the received video content item is a static video or a dynamic video, the static video includes video content in which a camera did not substantially move when the video content was captured, the dynamic video includes a camera motion metadata track, and the method further comprises generating the foveated mesh in response to determining that the received video content item is the static video.

In some embodiments, the at least one criterion includes determining whether the received video content item is associated with a particular type of input mesh and the method further comprises generating the foveated mesh in response to determining that the received video content item is associated with a cropped equirectangular mesh. In some embodiments, the foveated mesh is generated by deforming a two-dimensional UV map of the cropped equirectangular mesh using a polynomial fitting function.

In some embodiments, the method further comprises generating a first foveated mesh based on a first foveation ratio parameter and generating a second foveated mesh based on a second foveation ratio parameter.

In some embodiments, the foveated mesh is generated in response to determining that the received video content item is downsampled by a downsampling ratio from a first pixel resolution to a second pixel resolution and an improvement ratio at the central portion of each frame of the video content item corresponds with the downsampling ratio.

In some embodiments, the method further comprises transmitting the video content and the generated foveated mesh to a user device in response to receiving a request for the video content item from the user device.

In accordance with some embodiments of the disclosed subject matter, a system for generating immersive video content is provided, the system comprising a memory and a hardware processor that, when executing computer executable instructions stored in the memory, is configured to: receive a video content item; determine whether the video content item meets at least one criterion; in response to determining that the video content item meets the at least one criterion, generate a foveated mesh in accordance with a foveation ratio parameter on which frames of the video content item are to be projected, wherein the foveated mesh has a non-uniform position map that increases pixel density in a central portion of each frame of the video content item in comparison with peripheral portions of each frame of the video content item; and store the video content item in a file format that includes the generated foveated mesh, wherein the immersive video content is rendered by applying the video content item as a texture to the generated foveated mesh.

In accordance with some embodiments of the disclosed subject matter, a non-transitory computer-readable medium containing computer executable instructions that, when executed by a processor, cause the processor to perform a method for interacting with immersive video content is provided, the method comprising: receiving a video content item; determining whether the video content item meets at least one criterion; in response to determining that the video content item meets the at least one criterion, generating a foveated mesh in accordance with a foveation ratio parameter on which frames of the video content item are to be projected, wherein the foveated mesh has a non-uniform position map that increases pixel density in a central portion of each frame of the video content item in comparison with peripheral portions of each frame of the video content item; and storing the video content item in a file format that includes the generated foveated mesh, wherein the immersive video content is rendered by applying the video content item as a texture to the generated foveated mesh.

In accordance with some embodiments of the disclosed subject matter, a system for generating immersive video content is provided, the system comprising: means for receiving a video content item; means for determining whether the video content item meets at least one criterion; means for generating a foveated mesh in accordance with a foveation ratio parameter on which frames of the video content item are to be projected in response to determining that the video content item meets the at least one criterion, wherein the foveated mesh has a non-uniform position map that increases pixel density in a central portion of each frame of the video content item in comparison with peripheral portions of each frame of the video content item; and means for storing the video content item in a file format that includes the generated foveated mesh, wherein the immersive video content is rendered by applying the video content item as a texture to the generated foveated mesh.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for rendering immersive video content with foveated meshes are provided.

In some embodiments, the mechanisms described herein can determine whether video content meets one or more criterion and, in response to the video content meeting the one or more criterion, can generate a foveated mesh that can be used to render the video content as immersive video content, where the foveated mesh can increase the pixel density or resolution in a central portion of the video content.

As used herein, a foveated mesh is a mesh structure having a non-uniform UV or three-dimensional position map that increases the pixel density in a central portion of a video by trading off pixel density in peripheral portions of the video.

In some embodiments, the foveated mesh can be a modified version of a cropped equirectangular mesh. For example, the UV vertices in a cropped equirectangular mesh are uniformly distributed and the UV vertices in a foveated mesh are not uniformly distributed. In a more particular example, a 180-degree cropped equirectangular mesh can have a substantially uniform UV map. In continuing this example, a foveated mesh can be generated by deforming a two-dimensional UV map of a cropped equirectangular mesh using a polynomial fitting function such that the pixel density in a center portion of the video content item is increased in comparison with the pixel density in a peripheral portion of the video content item.

It should be noted that, in some embodiments, a similar deformation can be applied to the three-dimensional position mesh such that the pixel density in a center portion of the video content item is increased in comparison with the pixel density in a peripheral portion of the video content item, where the UV map remains unchanged.

It should also be noted that, in some embodiments, multiple foveated meshes can be generated. For example, the mechanisms can generate a first foveated mesh according to a first foveation strategy (e.g., a function based on a first foveation ratio parameter) and a second foveated mesh according to a second foveation strategy (e.g., a function based on a second foveation ratio parameter). In a more particular example, different foveation strategies can be implemented based on any suitable conditions (e.g., video type, resolution, computational resources, etc.). In another example, the mechanisms can select a foveation strategy from multiple foveation strategies based on one or more conditions and can generate a foveated mesh in accordance with the selected foveation strategy.

When rendering the video content on a suitable device (e.g., a virtual reality headset, a head mounted display device, a game console, a mobile phone, a tablet computer, a television, and/or any other suitable type of user device), the device can receive the video content in a format that includes the foveated mesh, where each frame of the video content is projected onto the foveated mesh. For example, the mechanisms described herein can generate a foveated mesh that can be used to render the video content as 180-degree video content, which can allow a viewer of the video content to feel immersed in the video content when viewing the video content. In another example, in some embodiments, the mechanisms described herein can generate a foveated mesh that can be used to render the video content as three-dimensional video content with any suitable spatial extent.

In some embodiments, the mechanisms described herein can generate the foveated mesh for a received video based on any suitable criterion.

For example, in some embodiments, the mechanisms can determine whether the received video is associated with a particular file format. In continuing this example, in response to determining that the received video has a VR180 file format that uses a directional stereoscopic projection with a 180-degree field of view and/or meets any other suitable criterion, the mechanisms can generate a foveated mesh for rendering the immersive video content.

In another example, in some embodiments, the mechanisms can determine whether the received video includes stereoscopic content (e.g., left eye/right eye views or images, three-dimensional images, etc.) or monoscopic content (e.g., a set of two-dimensional images). In continuing this example, monoscopic content can be presented as two-dimensional content in web interfaces, mobile interfaces, or otherwise non-headset interfaces, while stereoscopic content can be rendered for presentation on a virtual reality headset, a head mounted display device, etc. In response to determining that the received video includes stereoscopic content and/or meets any other suitable criterion, the mechanisms can generate a foveated mesh for rendering the immersive video content.

In yet another example, in some embodiments, the mechanisms can determine whether the received video is a static video or a dynamic video, where a static video generally refers to a video in which a camera or camera assembly did not substantially move at the time when the received video was captured. In response to determining that the received video is a static video and/or meets any other suitable criterion, the mechanisms can generate a foveated mesh for rendering the immersive video content.

In a further example, in some embodiments, the mechanisms can determine the type of input mesh associated with the received video. Examples of an input mesh associated with the received video can include a fisheye mesh and a cropped equirectangular mesh. In response to determining that the received video is associated with a cropped equirectangular mesh and/or meets any other suitable criterion, the mechanisms can generate a foveated mesh for rendering the immersive video content.

It should be noted that, in some embodiments, the mechanisms can generate a foveated mesh for rendering the received video as immersive video content when downsampling the video content. It should also be noted that the improvement ratio at the central portion of the video can be limited by the downsampling ratio. For example, when downsampling video content from a 4 k pixel resolution (e.g., 3849×2160 pixels or 4096×2160 pixels) to a 1080p resolution (e.g., 1920×1080 pixels), the highest improvement ratio at the central portion of the video is 4. Note that, in this implementation, the improvement ratio can be measured as the number of pixels in the rendered video content using the foveated mesh divided by the number of pixels in the rendered video content using the original mesh.

In a more particular example, the mechanisms can generate a foveated mesh for rendering immersive video content in response to determining that a received video is a static video that includes stereoscopic content in a VR180 file format and that is associated with a cropped equirectangular input mesh. It should be noted that any suitable criterion and any suitable combination of criterion can be used to determine whether to generate a foveated mesh.

In some embodiments, the video content and the generated foveated mesh can be transmitted to a user device for rendering by a user device (e.g., a virtual reality headset, a head mounted display device, etc.). For example, in some embodiments, the generated foveated mesh can be inserted into a video file that includes the video content, and the video file can be transmitted to the user device. Additionally or alternatively, in some embodiments, the generated foveated mesh can be used as an intermediary step prior to creating a projection of the video content and/or a three-dimensional equirectangular projection of the video content.

It should be noted that, in some embodiments, the video textures contained in the video content can also be modified by applying a similar foveation. For example, a foveation strategy that is applied in generating the foveated mesh can be used to modify the video textures contained in the video content such that, when rendering the immersive video content at the client device, the immersive video content appears undistorted, while trading off quality at the edges or peripheral portions of the video content for increased quality around the center of the video content (e.g., non-uniform pixel density or resolution).

It should also be noted that the foveated mesh can be used to render the immersive video content such that an improvement in the overall perceived video resolution or quality of the immersive video content is achieved, where pixel density or resolution in a central region of interest in each frame of the immersive video content given a static fixation point is greater than the pixel density or resolution in peripheral regions in each frame of the immersive video content.

These and other features for rendering immersive video content with foveated meshes are described hereinbelow in connection with FIGS. 1-4.

Figure 1:
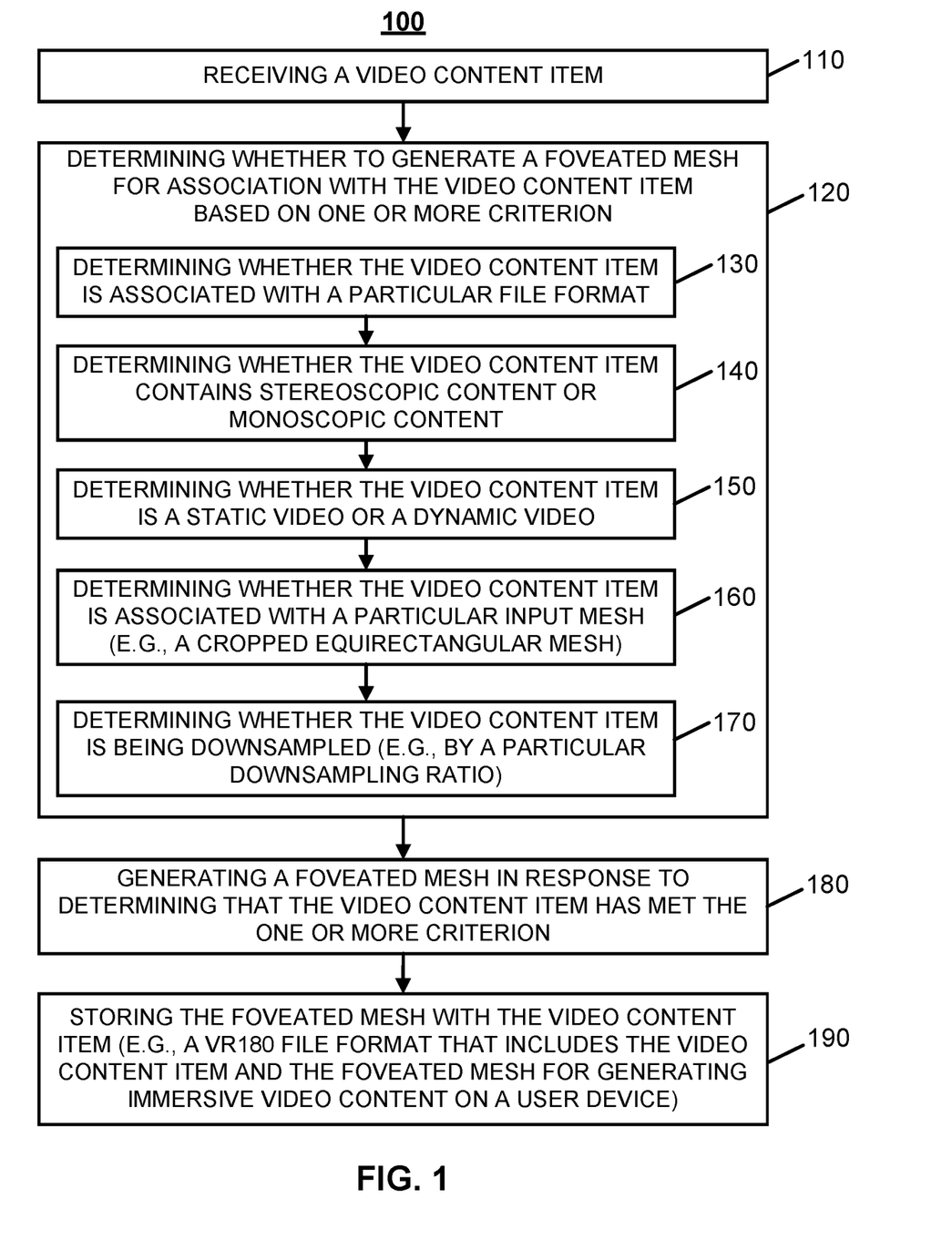
FIG. 1 shows an illustrative example of a process for determining whether to generate a foveated mesh and generating the foveated mesh in accordance with some embodiments of the disclosed subject matter.

Turning to FIG. 1, an illustrative example 100 of a process for determining whether to generate a foveated mesh and generating the foveated mesh is shown in accordance with some embodiments of the disclosed subject matter. In some embodiments, blocks of process 100 can be performed by any suitable device, such as a content server (e.g., content server 302 as shown in and described above in connection with FIG. 3) that stores video content and transmits the stored video content to user devices.

Process 100 can begin by receiving a video content item at 110. For example, process 100 can access an uploaded video content item that is stored on a content server. In another example, process 100 can select particular video content items that meet a particular criterion (e.g., upload date, view count, etc.). In a more particular example, process 100 can select particular video content items stored on the content server that meet particular criterion as described hereinbelow (e.g., stereoscopic, static videos with cropped equirectangular meshes). In yet another example, process 100 can receive a video content item that has been uploaded by a user having a user account.

It should be noted that the video content item can be received from any suitable source. For example, in some embodiments, stereoscopic video content can be captured using a physical camera device (e.g., a 360-degree stereoscopic camera rig for capturing 360-degree stereoscopic video, a VR180 camera device for capturing 180-degree stereoscopic video, a set of wide angle cameras, etc.). In continuing this example, a computing device, such as a virtual reality headset or a head mounted display device, can generate an immersive environment, such as an AR environment or a VR environment, based on the stereoscopic content.

Process 100 can continue, at 120, by determining whether to generate a foveated mesh for association with the video content item based on any suitable criterion. For example, process 100 can determine whether the received video content item meets one or more criterion and, in response to the video content item meeting the one or more criterion, can generate a foveated mesh that can be used to render the video content as immersive video content, where the foveated mesh can increase the pixel density or resolution in a central portion of the video content. In a more particular example, process 100 can determine that a foveated mesh is to be generated for stereo transcodes of static videos that are associated with cropped equirectangular input meshes.

In some embodiments, a criterion for generating a foveated mesh can include determining whether the received video is associated with a particular file format at 130. In continuing this example, process 100 can determine that the received video was captured using a VR180 camera and has a VR180 file format that uses a directional stereoscopic projection with a 180-degree field of view. In a more particular example, a particular file format can include metadata that, for example, defines the projection from video frames to partial viewports within a spherical coordinate system (e.g., spherical video metadata according to the Spherical Video V2 metadata standard) and process 100 can determine whether the received video is associated with a particular file format by determining the presence of such metadata. In another more particular example, when uploading the video content item to a content server, the uploading user can indicate that the video content item is associated with a particular file format (e.g., a VR180 file format) or can indicate that the video content item contains a particular type of content (e.g., 180-degree stereoscopic video content, 360-degree stereoscopic video content, etc.). As such, VR180 videos can be identified for processing or playback by the existence and the content of spherical video metadata according to the Spherical Video V2 metadata standard.

It should be noted that, in response to determining that the received video content item is associated with a particular file format, such as a VR180 file format, process 100 can proceed to determine whether the received video content item is a candidate for generating a foveated mesh. Alternatively, in response to determining that the received video content item is not associated with a particular file format, process 100 can determine that a foveated mesh is not to be generated for the received video content item.

In some embodiments, a criterion for generating a foveated mesh can include determining whether the received video content item includes stereoscopic content (e.g., left eye/right eye views or images, three-dimensional images, etc.) or monoscopic content (e.g., a set of two-dimensional images) at 140. In continuing this example, monoscopic content can be presented as two-dimensional content in web interfaces, mobile interfaces, or otherwise non-headset interfaces, while stereoscopic content can be rendered for presentation on a virtual reality headset, a head mounted display device, etc. In a more particular example, as described above, the received video content item can be associated with spherical video metadata that, for example, defines the projection from video frames to partial viewports within a spherical coordinate system and process 100 can determine whether the received video includes stereoscopic content or monoscopic content by determining the presence of stereoscopic-related fields in such metadata. In another more particular example, when uploading the video content item to a content server, the uploading user can indicate that the video content item contains a particular type of content (e.g., 180-degree stereoscopic video content, 360-degree stereoscopic video content, etc.).

It should be noted that, in response to determining that the received video content item includes stereoscopic content, such as 180-degree stereoscopic video content, process 100 can proceed to determine whether the received video content item is a candidate for generating a foveated mesh. Alternatively, in response to determining that the received video content item includes monoscopic content, process 100 can determine that a foveated mesh is not to be generated for the received video content item.

In some embodiments, a criterion for generating a foveated mesh can include determining whether the received video is a static video or a dynamic video at 150. For example, a static video generally refers to a video in which a camera or camera assembly, such as a VR180 camera or a stereoscopic camera rig, did not substantially move at the time when the received video was captured. Conversely, a dynamic video generally refers to a video in which a camera or camera assembly moved during video capture.

For example, as mentioned above, the video content item can be associated with metadata that defines the projection from video frames to partial viewports within a spherical coordinate system. For a dynamic video, such metadata that is associated with the video content item can include a camera motion metadata track that stores different types of camera motion metadata, such as camera orientation information, gyroscope information, accelerometer information, etc. The camera motion metadata track can, for example, provide rotation-based motion stabilization to the video content according to the camera's motion to align each video frame of the video content item with a fixed world orientation. In continuing this example, determining whether the received video is a static video or a dynamic video can include detecting the presence of particular metadata, such as the camera motion metadata track, where a video content item containing the camera motion metadata track can be designated as a dynamic video.

It should be noted that, in response to determining that the received video content item is a static video, process 100 can proceed to determine whether the received video content item is a candidate for generating a foveated mesh. Alternatively, in response to determining that the received video content item is a dynamic video, process 100 can determine that a foveated mesh is not to be generated for the received video content item. For example, in response to determining that the spherical video metadata of the received video content item includes the camera motion metadata track or other motion stabilization information, process 100 can determine that a foveated mesh is not to be generated for the received video content item.

In some embodiments, a criterion for generating a foveated mesh can include determining the type of input mesh or mesh format associated with the received video content item at 160. Illustrative examples of an input mesh associated with the received video content item can include a fisheye mesh and a cropped equirectangular mesh. For example, process 100 can determine whether the received video content item is associated with a cropped equirectangular input mesh by accessing the content of spherical video metadata according to the Spherical Video V2 metadata standard and determining whether the value of the ProjectionType element in the spherical video metadata is set to cropped equirectangular mesh.

It should be noted that, in response to determining that the received video content item is associated with a cropped equirectangular input mesh, process 100 can proceed to determine whether the received video content item is a candidate for generating a foveated mesh. Alternatively, in response to determining that the received video content item is associated with another mesh type (e.g., a fisheye mesh), process 100 can determine that a foveated mesh is not to be generated for the received video content item.

In some embodiments, a criterion for generating a foveated mesh can include determining whether the received video content item is being downsampled at 170. It should be noted that foveated meshes can provide the perception that video quality has increased by improving the pixel density in a central portion of each frame of the video content item by trading off or otherwise decreasing the pixel density in the peripheral portions of each frame of the video content item, where such improvement can be seen when downsampling the video content item.

It should also be noted that the improvement ratio at the central portion of each frame of the video content item can be limited by the downsampling ratio. For example, when downsampling a video content item from a 4 k pixel resolution (e.g., 3849×2160 pixels or 4096×2160 pixels) to a 1080p resolution (e.g., 1920×1080 pixels), the highest improvement ratio at the central portion of the video is about 4. Note that, in this implementation, the improvement ratio can be measured as the number of pixels in the rendered video content using the foveated mesh divided by the number of pixels in the rendered video content using the original mesh.

In response to determining that the received video content item is being downsampled, process 100 can proceed to determine whether the received video content item is a candidate for generating a foveated mesh. Alternatively, in response to determining that the received video content item is not being downsampled or in response to determining that the improvement ratio is not greater than a particular threshold value (e.g., an improvement ratio of 4), process 100 can determine that a foveated mesh is not to be generated for the received video content item.

Accordingly, in response to determining whether the received video content item meets one or more of the criterion in 130 through 170, process 100 can generate a foveated mesh that can be used to render the video content item as immersive video content at 180. For example, a foveated mesh can be generated for rendering immersive video content in response to determining that a received video is a static video that includes stereoscopic content in a VR180 file format and that is associated with a cropped equirectangular input mesh. It should be noted that, although the embodiments described herein generally relate to generating a foveated mesh for static videos containing stereoscopic content that is associated with a cropped equirectangular input mesh, any suitable criterion and any suitable combination of criterion can be used to determine whether to generate a foveated mesh.

As described herein, a foveated mesh is a mesh structure having a non-uniform UV or three-dimensional position map that increases the pixel density in a central portion of a video by trading off pixel density in peripheral portions of the video.

In some embodiments, a transcoding system or transcoding pipeline for stereo transcodes of videos can be modified to generate foveated meshes or otherwise implement a foveation strategy. The transcoding system can include a transcoder control component that sets up the video parameters and transcoder metadata, which may include creating the target mesh, needed for reprojecting or otherwise transforming a video from one mesh format to another.

It should be noted that, in some embodiments, the transcoder control component can be modified to create parameterized foveated meshes by passing a foveation ratio parameter. In some embodiments, the foveated mesh can be a modified version of a cropped equirectangular mesh. For example, the UV vertices in a cropped equirectangular mesh are uniformly distributed and the UV vertices in a foveated mesh are not uniformly distributed. In a more particular example, a 180-degree cropped equirectangular mesh can have a substantially uniform UV map. In continuing this example, a foveated mesh can be generated by deforming a two-dimensional UV map of a cropped equirectangular mesh using a polynomial fitting function such that the pixel density in a central portion of the video content item is increased in comparison with the pixel density in peripheral portions of the video content item.

It should be noted that, in some embodiments, a similar deformation based on a foveation ratio parameter can be applied to the three-dimensional position mesh such that the pixel density in a center portion of the video content item is increased in comparison with the pixel density in a peripheral portion of the video content item, where the UV map remains unchanged.

In a more particular example, process 100 can foveat a normalized coordinate, normalized_coord, based on a foveation ratio parameter, foveation_ratio. It should be noted that, in some embodiments, this can include clamping an input coordinate or otherwise limiting a position to a range [0.0, 1.0]. This mesh foveation can be represented as follows:

$$\text{clamped\_coord} = \text{clamp}(0.0, 1.0, \text{normalized\_coord})$$

$$\text{foveated\_coord} = 0.5 + a\tan(\text{sqrt}(\text{foveation\_ratio})*\tan((\text{clamped\_coord}-0.5)*\pi))/\pi$$

In continuing this example, process 100 can unfoveat a normalized coordinate by performing the inverse, which can be represented as follows:

$$\text{clamped\_coord} = \text{clamp}(0.0, 1.0, \text{normalized\_coord})$$

$$\text{unfoveated\_coord} = a\tan(\tan((\text{clamped\_coord}-0.5)*\pi))/\text{sqrt}(\text{foveation\_ratio}))/\pi + 0.5$$

It should be noted that, in some embodiments, multiple foveated meshes can be generated. For example, a first foveated mesh can be generated according to a first foveation strategy (e.g., a polynomial fitting function based on a first foveation ratio parameter) and a second foveated mesh can be generated according to a second foveation strategy (e.g., a polynomial fitting function based on a second foveation ratio parameter). In a more particular example, different foveation strategies can be implemented based on any suitable conditions (e.g., video type, resolution, computational resources, etc.). In another example, a foveation strategy can be selected from multiple foveation strategies based on one or more conditions and can generate a foveated mesh in accordance with the selected foveation strategy.

Turning back to FIG. 1, in some embodiments, process 100 can store the video content item and the foveated mesh at 190. For example, process 100 can insert the foveated mesh with the video content item in a particular file format (e.g., a VR180 file format).

When rendering the video content on a suitable device (e.g., a virtual reality headset, a head mounted display device, a game console, a mobile phone, a tablet computer, a television, and/or any other suitable type of user device), the device can receive the video content in a format that includes the foveated mesh, where each frame of the video content is projected onto the foveated mesh. For example, the mechanisms described herein can generate a foveated mesh that can be used to render the video content as 180-degree video content, which can allow a viewer of the video content to feel immersed in the video content when viewing the video content. In another example, in some embodiments, the mechanisms described herein can generate a foveated mesh that can be used to render the video content as three-dimensional video content with any suitable spatial extent.

It should be noted that the foveated mesh can be used to render the immersive video content such that an improvement in the overall perceived video resolution or quality of the immersive video content is achieved, where pixel density or resolution in a central region of interest in each frame of the immersive video content given a static fixation point is greater than the pixel density or resolution in peripheral regions in each frame of the immersive video content.

In some embodiments, the video content and the generated foveated mesh can be transmitted to a user device for rendering by a user device (e.g., a virtual reality headset, a head mounted display device, etc.).

Figure 2:
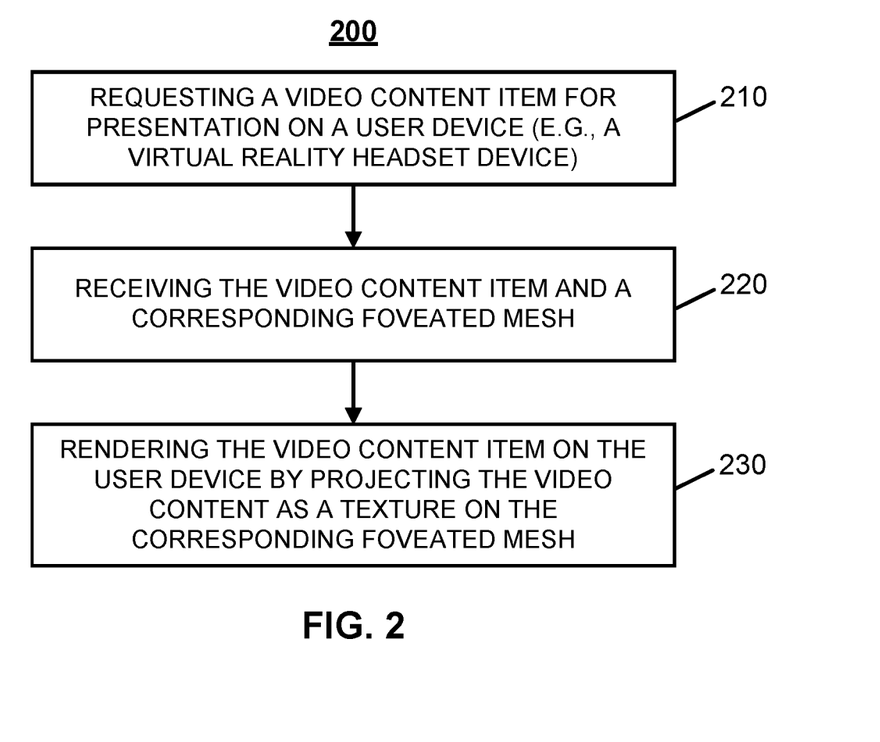
FIG. 2 shows an illustrative example of a process for rendering immersive video content using a foveated mesh in accordance with some embodiments of the disclosed subject matter.

Turning to FIG. 2, an illustrative example 200 of a process for rendering immersive video content is shown in accordance with some embodiments of the disclosed subject matter. In some embodiments, blocks of process 200 can be executed by any suitable device, such as a virtual reality headset, a game console, a mobile phone, a tablet computer, a television, and/or any other suitable type of user device.

Process 200 can begin at 210 by requesting a video content item for presentation on a user device. In some embodiments, the video content item can be any suitable type of video content item, such as a video to be streamed to the user device from a content server, and/or any other suitable type of video content item. In some embodiments, the video content item can be requested on the user device in any suitable manner. For example, in some embodiments, the video content item can be requested in response to a user of the user device selecting the video content item from a page containing available video content, and/or in any other suitable manner. The request for a video content item may be transmitted from a user device to a content server (e.g., a content server 302 as shown in and described above in connection with FIG. 3).

Process 200 can receive the video content item and a corresponding foveated mesh to be used to render the video content item at 220 in response to the request transmitted at 210. For example, in some embodiments, the video content item and the corresponding foveated mesh can be received from a content server (e.g., content server 302 as shown in and described above in connection with FIG. 3) that stores the video content and/or that generated the foveated mesh, as described above in connection with FIG. 1. In some embodiments, the video content item and the corresponding foveated mesh can be received in any suitable manner. For example, in some embodiments, the foveated mesh can be inserted into a video file that includes the video content item, and process 200 can extract the foveated mesh from the video file using any suitable technique or combination of techniques. It should be noted that any suitable approach can be used to inject the corresponding foveated mesh into the video content item.

Process 200 can render the video content item on the user device as immersive content at 230 using any suitable technique or combination of techniques. For example, in some embodiments, process 200 can apply or project the video content item onto the foveated mesh to render the video content item as immersive content. As a more particular example, in some embodiments, process 200 can use any suitable technique (e.g., UV mapping, and/or any other suitable technique(s)) for mapping content from the video content item to the foveated mesh as a texture. As another example, in some embodiments, process 200 can render the video content item as stereoscopic content by presenting a first portion of the video content item to a left eye of a viewer of the user device and a second portion of the video content item to a right eye of the viewer of the user device. In some such embodiments, the first portion of the video content item and the second portion of the video content item can be separately applied or projected onto the foveated mesh prior to rendering on the user device.

In some embodiments, process 200 can render the video content item as immersive content that can be manipulated or interacted with by a viewer of the video content item. For example, in some embodiments, process 200 can render the video content item in a manner that can allow a viewer to change a viewpoint of the video content item. As a more particular example, in some embodiments, in instances where the viewer is using a virtual reality headset or other wearable computing device, process 200 can change a presented viewpoint of the video content item in response to determining that the viewer has changed an orientation of the viewer's head. As another more particular example, in some embodiments, process 200 can change a presented viewpoint of the video content item in response to determining that the viewer has input a gesture on the user device to manipulate the viewpoint, such as by selecting and dragging a user interface on which the video content item is presented.

Figure 3:
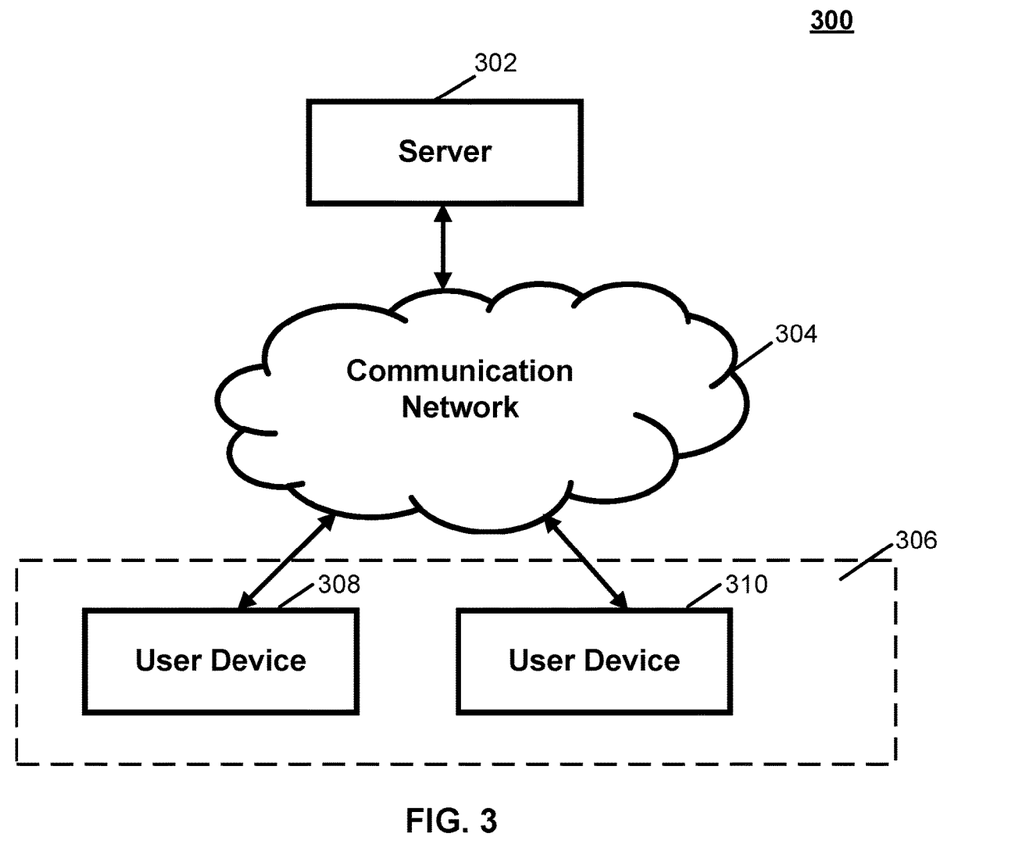
FIG. 3 shows a schematic diagram of an illustrative system suitable for implementation of mechanisms described herein for determining whether to generate a foveated mesh and generating the foveated mesh in accordance with some embodiments of the disclosed subject matter.

Turning to FIG. 3, an illustrative example 300 of hardware for determining whether to generate a foveated mesh, generating the foveated mesh, and/or rendering immersive video content using the foveated mesh that can be used in accordance with some embodiments of the disclosed subject matter is shown. As illustrated, hardware 300 can include a content server 302, a communication network 304, and/or one or more user devices 306, such as user devices 308 and 310.

Content server 302 can be any suitable server(s) for storing and/or providing media content to user devices 306. For example, in some embodiments, content server 302 can store media content, such as videos, television programs, movies, live-streamed media content, audio content, animations, video game content, graphics, and/or any other suitable media content. In some embodiments, content server 302 can transmit media content to user devices 306, for example, via communication network 304. In some embodiments, content server 302 can store video content (e.g., live video content, computer-generated video content, and/or any other suitable type of video content) in association with any suitable information to be used by a client device (e.g., user device 306) to render the video content as immersive content, as shown in and described above in connection with FIG. 2.

Communication network 304 can be any suitable combination of one or more wired and/or wireless networks in some embodiments. For example, communication network 304 can include any one or more of the Internet, an intranet, a wide-area network (WAN), a local-area network (LAN), a wireless network, a digital subscriber line (DSL) network, a frame relay network, an asynchronous transfer mode (ATM)

network, a virtual private network (VPN), and/or any other suitable communication network. User devices 306 can be connected by one or more communications links (e.g., communications links 312) to communication network 304 that can be linked via one or more communications links (e.g., communications links 314) to content server 302. The communications links can be any communications links suitable for communicating data among user devices 306 and content server 302, such as network links, dial-up links, wireless links, hard-wired links, any other suitable communications links, or any suitable combination of such links.

User devices 306 can include any one or more user devices suitable for requesting video content, rendering the requested video content as immersive video content (e.g., as virtual reality content, as three-dimensional content, as 360-degree video content, as 180-degree video content, and/or in any other suitable manner) and/or for performing any other suitable functions. For example, in some embodiments, user devices 306 can include a mobile device, such as a mobile phone, a tablet computer, a wearable computer, a laptop computer, a virtual reality headset, a vehicle (e.g., a car, a boat, an airplane, or any other suitable vehicle) information or entertainment system, and/or any other suitable mobile device and/or any suitable non-mobile device (e.g., a desktop computer, a game console, and/or any other suitable non-mobile device). As another example, in some embodiments, user devices 306 can include a media playback device, such as a television, a projector device, a game console, desktop computer, and/or any other suitable non-mobile device.

In a more particular example where user device 306 is a head mounted display device that is worn by the user, user device 306 can include a head mounted display device that is connected to a portable handheld electronic device. The portable handheld electronic device can be, for example, a controller, a smartphone, a joystick, or another portable handheld electronic device that can be paired with, and communicate with, the head mounted display device for interaction in the immersive environment generated by the head mounted display device and displayed to the user, for example, on a display of the head mounted display device.

It should be noted that the portable handheld electronic device can be operably coupled with, or paired with the head mounted display device via, for example, a wired connection, or a wireless connection such as, for example, a WiFi or Bluetooth connection. This pairing, or operable coupling, of the portable handheld electronic device and the head mounted display device can provide for communication between the portable handheld electronic device and the head mounted display device and the exchange of data between the portable handheld electronic device and the head mounted display device. This can allow, for example, the portable handheld electronic device to function as a controller in communication with the head mounted display device for interacting in the immersive virtual environment generated by the head mounted display device. For example, a manipulation of the portable handheld electronic device, and/or an input received on a touch surface of the portable handheld electronic device, and/or a movement of the portable handheld electronic device, can be translated into a corresponding selection, or movement, or other type of interaction, in the virtual environment generated and displayed by the head mounted display device.

It should also be noted that, in some embodiments, the portable handheld electronic device can include a housing in which internal components of the device are received. A user interface can be provided on the housing, accessible to the user. The user interface can include, for example, a touch sensitive surface configured to receive user touch inputs, touch and drag inputs, and the like. The user interface can also include user manipulation devices, such as, for example, actuation triggers, buttons, knobs, toggle switches, joysticks and the like.

It should further be noted that, in some embodiments, the head mounted display device can include a housing coupled to a frame, with an audio output device including, for example, speakers mounted in headphones, also coupled to the frame. For example, a front portion of the housing can be rotated away from a base portion of the housing so that some of the components received in the housing are visible. A display can be mounted on an interior facing side of the front portion of the housing. In some embodiments, lenses can be mounted in the housing, between the user's eyes and the display when the front portion is in the closed position against the base portion of the housing. The head mounted display device can include a sensing system including various sensors and a control system including a processor and various control system devices to facilitate operation of the head mounted display device.

For example, in some embodiments, the sensing system can include an inertial measurement unit including various different types of sensors, such as, for example, an accelerometer, a gyroscope, a magnetometer, and other such sensors. A position and orientation of the head mounted display device can be detected and tracked based on data provided by the sensors included in the inertial measurement unit. The detected position and orientation of the head mounted display device can allow the system to, in turn, detect and track the user's head gaze direction, and head gaze movement, and other information related to the position and orientation of the head mounted display device.

In some implementations, the head mounted display device can include a gaze tracking device including, for example, one or more sensors to detect and track eye gaze direction and movement. Images captured by the sensor(s) can be processed to detect and track direction and movement of the user's eye gaze. The detected and tracked eye gaze can be processed as a user input to be translated into a corresponding interaction in the immersive virtual experience. A camera can capture still and/or moving images that can be used to help track a physical position of the user and/or other external devices in communication with/operably coupled with the head mounted display device. The captured images can also be displayed to the user on the display in a pass through mode.

Although content server 302 is illustrated as one device, the functions performed by content server 302 can be performed using any suitable number of devices in some embodiments. For example, in some embodiments, multiple devices can be used to implement the functions performed by content server 302. In a more particular example, in some embodiments, a first content server can storage media content items and respond to requests for media content and a second content server can generate thumbnail representations of virtual objects that correspond to a requested media content item.

Although two user devices 308 and 310 are shown in FIG. 3 to avoid over-complicating the figure, any suitable number of user devices, and/or any suitable types of user devices, can be used in some embodiments.

Content server 302 and user devices 306 can be implemented using any suitable hardware in some embodiments. For example, in some embodiments, devices 302 and 306 can be implemented using any suitable general purpose computer or special purpose computer. For example, a mobile phone may be implemented using a special purpose computer. Any such general purpose computer or special purpose computer can include any suitable hardware. For example, as illustrated in example hardware 400 of FIG. 4, such hardware can include hardware processor 402, memory and/or storage 404, an input device controller 406, an input device 408, display/audio drivers 410, display and audio output circuitry 412, communication interface(s) 414, an antenna 416, and a bus 418.

Figure 4:
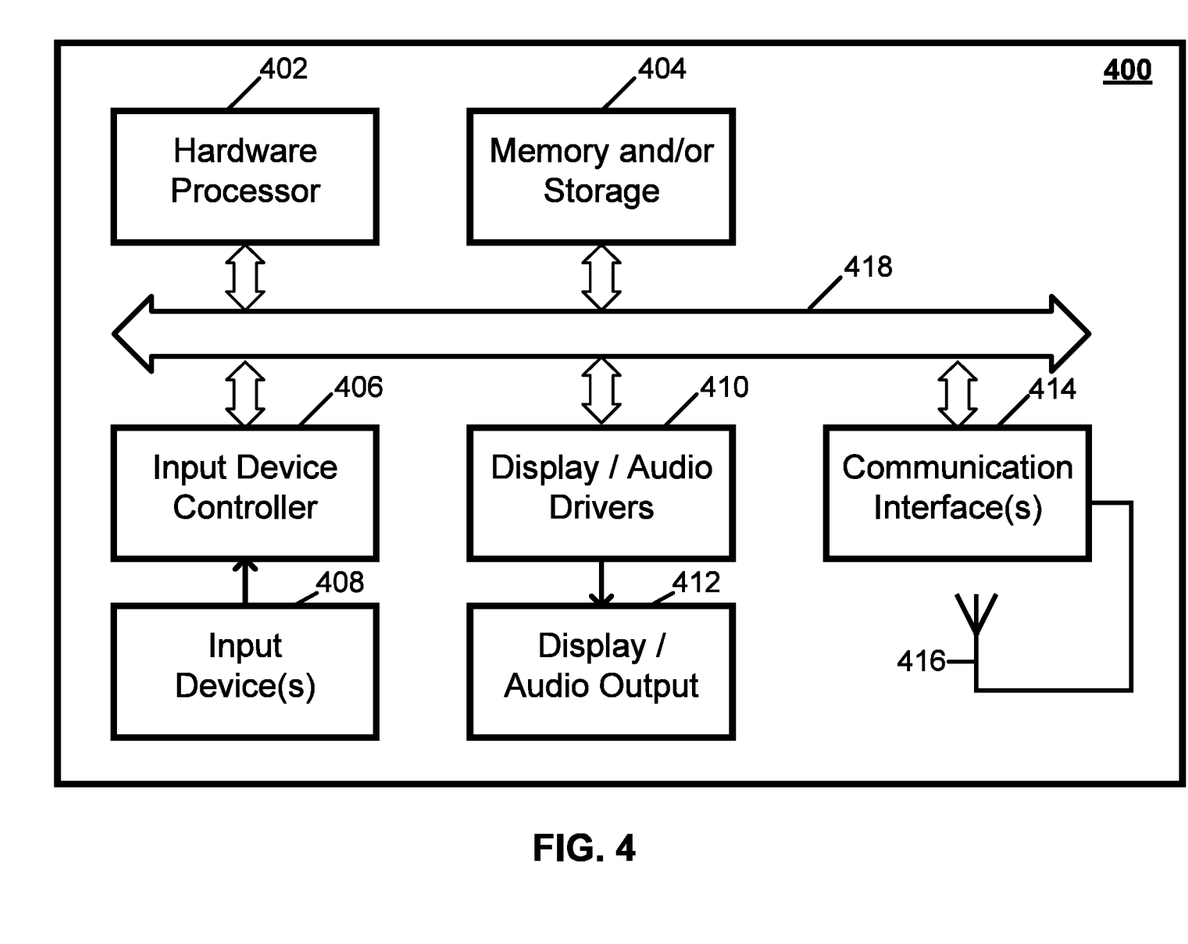
FIG. 4 shows a detailed example of hardware that can be used in a server and/or a user device of FIG. 3 in accordance with some embodiments of the disclosed subject matter.

Hardware processor 402 can include any suitable hardware processor, such as a microprocessor, a micro-controller, digital signal processor(s), dedicated logic, and/or any other suitable circuitry for controlling the functioning of a general purpose computer or a special purpose computer in some embodiments. In some embodiments, hardware processor 402 can be controlled by a server program stored in memory and/or storage 404 of a server (e.g., such as content server 402). For example, in some embodiments, the server program can cause hardware processor 402 to transmit a media content item to user device 206, transmit instructions for presenting rendering a video content item as immersive video content, and/or performing any other suitable actions. In some embodiments, hardware processor 402 can be controlled by a computer program stored in memory and/or storage 404 of user device 406. For example, the computer program can cause hardware processor 402 to render a video content item as immersive video content, and/or perform any other suitable actions.

Memory and/or storage 404 can be any suitable memory and/or storage for storing programs, data, media content, and/or any other suitable information in some embodiments. For example, memory and/or storage 404 can include random access memory, read-only memory, flash memory, hard disk storage, optical media, and/or any other suitable memory.

Input device controller 406 can be any suitable circuitry for controlling and receiving input from one or more input devices 408 in some embodiments. For example, input device controller 406 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 410 can be any suitable circuitry for controlling and driving output to one or more display/audio output devices 412 in some embodiments. For example, display/audio drivers 410 can be circuitry for driving a touchscreen, a flat-panel display, a cathode ray tube display, a projector, a speaker or speakers, and/or any other suitable display and/or presentation devices.

Communication interface(s) 414 can be any suitable circuitry for interfacing with one or more communication networks, such as network 304 as shown in FIG. 3. For example, interface(s) 414 can include network interface card circuitry, wireless communication circuitry, and/or any other suitable type of communication network circuitry.

Antenna 416 can be any suitable one or more antennas for wirelessly communicating with a communication network (e.g., communication network 304) in some embodiments. In some embodiments, antenna 416 can be omitted.

Bus 418 can be any suitable mechanism for communicating between two or more components 402, 404, 406, 410, and 414 in some embodiments.

Any other suitable components can be included in hardware 400 in accordance with some embodiments.

In some embodiments, at least some of the above described blocks of the processes of FIGS. 1 and 2 can be executed or performed in any order or sequence not limited to the order and sequence shown in and described in connection with the figures. Also, some of the above blocks of FIGS. 1 and 2 can be executed or performed substantially simultaneously where appropriate or in parallel to reduce latency and processing times. Additionally or alternatively, some of the above described blocks of the processes of FIGS. 1 and 2 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

In situations in which the systems described herein collect personal information about users, or make use of personal information, the users may be provided with an opportunity to control whether programs or features collect user information (e.g., information about a user's social network, social actions or activities, profession, a user's preferences, or a user's current location). In addition, certain data may be treated in one or more ways before it is stored or used, so that personal information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Accordingly, methods, systems, and media for rendering immersive video content with foveated meshes are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for generating immersive video content, the method comprising:
receiving a video content item;
determining, using a hardware processor, whether the video content item includes stereoscopic content;

in response to determining that the video content item includes stereoscopic content, determining, using the hardware processor, that a foveated mesh is to be generated for transcoding the stereoscopic content of the video content that is currently associated with an equirectangular input mesh;

generating, using the hardware processor, the foveated mesh in accordance with a foveation ratio parameter on which frames of the video content item are to be projected, wherein the foveated mesh has a non-uniform position map that increases pixel density in a central portion of each frame of the video content item in comparison with peripheral portions of each frame of the video content item; and storing the video content item in a file format that includes the generated foveated mesh in replacement of the equirectangular input mesh, wherein the immersive video content is rendered by applying the video content item as a texture to the generated foveated mesh.

2. The method of claim 1, further comprising determining whether the received video content item is associated with a particular file format.

3. The method of claim 2, wherein the particular file format includes a VR180 file format that uses a directional stereoscopic projection with a 180-degree field of view.

4. The method of claim 1, further comprising determining whether the received video content item is a static video or a dynamic video, wherein the static video includes video content in which a camera did not substantially move when the video content was captured, wherein the dynamic video includes a camera motion metadata track, and wherein the method further comprises generating the foveated mesh in response to determining that the received video content item is the static video.

5. The method of claim 1, further comprising determining whether the received video content item is associated with a particular type of input mesh and wherein the method further comprises generating the foveated mesh in response to determining that the received video content item is associated with a cropped equirectangular mesh.

6. The method of claim 5, wherein the foveated mesh is generated by deforming a two-dimensional UV map of the cropped equirectangular mesh using a polynomial fitting function.

7. The method of claim 1, further comprising generating a first foveated mesh based on a first foveation ratio parameter and generating a second foveated mesh based on a second foveation ratio parameter.

8. The method of claim 1, wherein the foveated mesh is generated in response to determining that the received video is downsampled by a downsampling ratio from a first pixel resolution to a second pixel resolution and wherein an improvement ratio at the central portion of each frame of the video content item corresponds with the downsampling ratio.

9. The method of claim 1, further comprising transmitting the video content and the generated foveated mesh to a user device in response to receiving a request for the video content item from the user device.

10. A system for generating immersive video content, the system comprising:
a memory; and
a hardware processor that, when executing computer-executable instructions stored in the memory, is configured to:
receive a video content item;
determine whether the video content item includes stereoscopic content;
in response to determining that the video content item includes stereoscopic content, determine that a foveated mesh is to be generated for transcoding the stereoscopic content of the video content that is currently associated with an equirectangular input mesh;
generate the foveated mesh in accordance with a foveation ratio parameter on which frames of the video content item are to be projected, wherein the foveated mesh has a non-uniform position map that increases pixel density in a central portion of each frame of the video content item in comparison with peripheral portions of each frame of the video content item; and
store the video content item in a file format that includes the generated foveated mesh in replacement of the equirectangular input mesh, wherein the immersive video content is rendered by applying the video content item as a texture to the generated foveated mesh.

11. The system of claim 10, wherein the hardware processor is further configured to determine whether the received video content item is associated with a particular file format.

12. The system of claim 11, wherein the particular file format includes a VR180 file format that uses a directional stereoscopic projection with a 180-degree field of view.

13. The system of claim 10, wherein the hardware processor is further configured to determine whether the received video content item is a static video or a dynamic video, wherein the static video includes video content in which a camera did not substantially move when the video content was captured, wherein the dynamic video includes a camera motion metadata track, and wherein the hardware processor is further configured to generate the foveated mesh in response to determining that the received video content item is the static video.

14. The system of claim 10, wherein the hardware processor is further configured to determine whether the received video content item is associated with a particular type of input mesh and wherein the hardware processor is further configured to generate the foveated mesh in response to determining that the received video content item is associated with a cropped equirectangular mesh.

15. The system of claim 14, wherein the foveated mesh is generated by deforming a two-dimensional UV map of the cropped equirectangular mesh using a polynomial fitting function.

16. The system of claim 10, wherein the hardware processor is further configured to generate a first foveated mesh based on a first foveation ratio parameter and generate a second foveated mesh based on a second foveation ratio parameter.

17. The system of claim 10, wherein the foveated mesh is generated in response to determining that the received video is downsampled by a downsampling ratio from a first pixel resolution to a second pixel resolution and wherein an improvement ratio at the central portion of each frame of the video content item corresponds with the downsampling ratio.

18. The system of claim 10, wherein the hardware processor is further configured to transmit the video content and the generated foveated mesh to a user device in response to receiving a request for the video content item from the user device.

19. A non-transitory computer-readable medium containing computer executable instructions that, when executed by a processor, cause the processor to perform a method for generating immersive video content, the method comprising:
- receiving a video content item;
- determining, using a hardware processor, whether the video content item includes stereoscopic content;
- in response to determining that the video content item includes stereoscopic content, determining, using the hardware processor, that a foveated mesh is to be generated for transcoding the stereoscopic content of the video content that is currently associated with an equirectangular input mesh;
- generating, using the hardware processor, the foveated mesh in accordance with a foveation ratio parameter on which frames of the video content item are to be projected, wherein the foveated mesh has a non-uniform position map that increases pixel density in a central portion of each frame of the video content item in comparison with peripheral portions of each frame of the video content item; and
- storing the video content item in a file format that includes the generated foveated mesh in replacement of the equirectangular input mesh, wherein the immersive video content is rendered by applying the video content item as a texture to the generated foveated mesh.

* * * * *